3,049,568
PREPARATION OF BISPHENOLS
Francis N. Apel, Nutley, Louis B. Conte, Jr., Newark, and Howard L. Bender, Sparta, N.J., assignors to Union Carbide Corporation, a corporation of New York
No Drawing. Filed Oct. 20, 1958, Ser. No. 768,050
6 Claims. (Cl. 260—619)

This invention relates to the preparation of bisphenols by the condensation of phenols with ketones and, more particularly, to the condensation of phenols with ketones to produce bisphenols by the use of a novel reaction catalyst.

Bisphenols produced from the condensation of phenols with ketones, particularly the bisphenol produced from the condensation of phenol per se and acetone enjoy a growing importance as chemical intermediates; particularly in the rapidly expanding fields of epoxy resins and polycarbonate resins. Prime considerations in the selection of bisphenol intermediates in these applications are their purity and their cost.

Presently known processes for the production of bisphenols can provide relatively high purity products, but at high cost; or they can provide low cost bisphenols which, however, are relatively impure. No process heretofore known can provide a bisphenol which is both high in purity and low in cost. The reason for this is that in known processes any effort to increase the rate of production and thereby reduce costs results in a worsening of the impurity problem. For example, the most commonly employed process for the production of bisphenols employs a strong mineral acid, such as hydrochloric or sulfuric acid as a catalyst for the condensation reaction. The rate of reaction with these catalysts is not altogether satisfactory and much effort has expended in efforts to increase the reaction rate and yield of these acid catalyzed reactions. In addition, use of such mineral acid catalysts requires corrosion resistant equipment which not only is initially costly but also requires continual maintenance or periodic replacement since it is generally attacked by heated acid gases and liquids which are present during the reaction. In addition, it has been found that the presence of mineral acids in the reaction zone causes a number of side reactions which decrease overall yield by consuming reactants and intensify product separation problems. Another major drawback to the use of mineral acid catalysts is that any acid present in the product, and with known processes there is always some, must be neutralized or washed out before the product is recovered. The neutralization or washing procedure is not only an extra step requiring additional time and increasing costs, but also may leave salt products in the apparatus which pose added purification problems. If a washing step is employed the unusually large volume of water required to remove all acid and acid products can cause a significant loss of product.

It is known that mineral acid catalyzed condensations of phenols with ketones can be markedly increased in rate by the use of a soluble catalyst promoter in the reaction zone. These promoters are generally sulfur-containing compounds and may be liquids, gases or solids. It is also known, however, that the addition of a promoter to the reaction causes product contamination which in many instances offsets the economic advantage achieved by the increase in rate of condensation. Sulfur contamination imparts a characteristic odor and discoloration to the product and is an impurity which is particularly difficult to remove. For lack of a better commercial process, however, bisphenols currently are produced with mineral acid catalysts in the presence of a soluble sulfur-containing promoter. The bisphenols thus produced must undergo extensive purification prior to use in applications where high purity intermediates are required. In a use such as the manufacture of polycarbonate resins, the purification procedures for currently available bisphenols become very complex and are a major cost factor.

It is an object, therefore, of the present invention to provide a method and a novel catalyst which provide a rapid condensation of phenol with a ketone to a bisphenol of very high purity, and in nearly theoretical yields without a trace of catalyst or promoter in the product. Other objects will be evident from the following disclosure.

According to the present invention, we have now discovered a highly desirable process for the preparation of bisphenols which secures the above objects among others. This process basically includes the step of contacting a mixture of a ketone and a phenol with a substantially insoluble cationic exchanging resin which has been partially esterified with a mercapto alcohol. This insoluble cationic exchanging catalyst very surprisingly provides a rapid rate of reaction between the phenol and ketone and leaves no contaminants or odor to impair the quality of the bisphenol produced. Thus extensive purification steps of the bisphenol product are avoided and production costs are substantially decreased.

The catalysts employed in the instant invention can be prepared from any cation exchange resin which is substantially insoluble in the reaction mixture at the reaction temperatures employed and in any solvent to which the resin might be exposed during normal service life. Resin insolubility is generally imparted by cross-linking within the resin structure, but can be influenced and imparted by other factors such as the molecular weight and/or the degree of crystallinity of the resin or polymer.

However, the chemical structure of the polymeric or resinous skeleton is not critical to the operation of the catalysts of this invention. For example, the resins can be the sulfonated styrene-divinyl benzene resins, sulfonated cross-linked styrene resins, phenol-formaldehyde sulfonic acid resins, benzene-formaldehyde sulfonic acid resins, and others of similar nature can be employed. These resins are being marketed currently under such names as "Amberlite" XE-100, "Dowex" 50-X-4, "Permutit" QH and "Cempro" C-20. The only critical and necessary requirements for their operation is insolubility, possession of a cationic exchanging potential and a degree of esterification with the mercapto alcohol.

The ion exchange potential of these resins is determined by the number of cationic exchanging groups bound to the polymeric structure. This is generally termed the "exchange capacity" of the resin. Some resins are currently marketed by their "exchange capacity" in milliequivalents per gram of dry resin, or it can be determined by passing a salt such as NaCl through a sample of resin and titrating the effluent solution. The exchange capacity is then calculated from the formula $$\frac{(ml.)(N)}{W}$$

wherein ml. is milliliters of the titrant added, N is the normality and W the dry weight of the resin sample.

A more accurate criterion of the effectiveness of a given ion exchange resin as a catalyst than the "exchange capacity," however, is the number of available cationic exchanging groups for contact with the reactants. Contact of the ion exchange resins with the reactants occurs only at the resin surfaces therefore a form of resin which provides the maximum surface is highly desirable. For instance, a finely ground resin, or fine beads or microspheres, preferably being of a porous nature, can be used to provide the greatest number of available exchanging groups.

We particularly prefer the resins which exhibit a high exchange capacity for basic ions, and particularly those which have an exchange capacity of at least 2 milliequivalents per gram. However, those resins having exchange capacities as low as 0.5 milliequivalent per gram can be used in the process of this invention, although somewhat longer reaction times are required for equivalent conversions. These high exchange capacity resins are generally those having a large number of strong acid groups chemically bound to polymeric residues, and particularly preferred are those having sulfonic acid groups.

While it might be expected with the novel catalysts of this invention that the catalytic effectiveness of these resins would be decreased by esterifying part of the cationic exchanging groups with the mercapto alcohols, the catalytic effectiveness of the thus prepared resin is very surprisingly increased over that of the plain non-esterified resin, particularly when between about 3 and 20 percent of the ionic groups are esterified. While it is possible to esterify more than 20 percent or less than 3 percent of the ionic exchanging groups with the alcohol, the reaction rates between the phenol and the ketone decrease proportionately as the per cent esterification gets further away from this range. We particularly prefer to esterify between about 5 and 15 percent of the total available cationic exchanging groups, since such resins have been found to be the most effective catalysts in this invention. The percent of esterified groups can easily be determined by measuring the exchange capacity before and after esterification and determining the percentage difference. This is a reasonable equivalent to the degree of esterification by the mercapto alcohol.

The mercapto alcohols used to esterify the cationic exchanging resins of this invention are the aliphatic hydroxy thiols, containing at least one hydroxy group and at least one mercapto group, although additional hydroxy and mercapto groups can be present. We particularly prefer the lower alkyl mercapto alcohols (hydroxy alkyl thiols) containing from about one to six carbon atoms. Mercapto ethanol, mercapto propanol and mercapto butanol provide particularly good results.

Esterification of the cationic exchange groups of the resin is readily effected without need of elevated temperature or other added catalyst, although such can be used if desired. Preferably, we add the mercapto alcohol slowly to an anhydrous fluid mixture of the resin, preferably in a neutral inert organic solvent, for example, heptane, benzene and similar liquids. Stirring or agitation in a fluid mixture provides good mixing of the mercapto alcohol and permits equal partial esterification throughout the resin mass without localized areas of complete esterification which might inactivate certain ion exchanging resin particles.

It is necessary in order for the esterification to be carried out and for the catalyst to be effective in the reaction, that the cation exchange group be in the hydrogen (or acid form). While many of the commercial cation exchange resins are sold and marketed in the sodium or salt form, the only effective and active form is the hydrogen form ($H^+$). With such resins, regeneration to this form by washing with an acid is necessary. With the sulfonated resins for example, a washing with a sulfuric acid solution is preferred, although other acids can be employed if desired for this regeneration. Soluble salts formed during the regeneration can be removed from the resin by additional washings with water or other solvents.

Prior to the use of these esterified cationic exchanging resins in the condensation of phenols with ketones, it is necessary for maximum reaction efficiency that the resin be substantially anhydrous, i.e., contains less than about 2–3% water by weight. The presence of water in excess of this amount in the reaction zone has been found to seriously affect the reaction rate and the yields of bisphenols in this process. Since water is a by-product in the reaction, the amount of water present should be closely controlled.

Dehydration of the resin before use or during use is easily effected by any of several means. Heating to dryness in an oven, or heating with an azeotrope forming agent for the water is satisfactory. We have also found that soaking in phenol or heating a mixture of phenol and the resin is a particularly desirable way of dehydrating the resin. It is likewise possible during operation of the process to conduct the reaction with a high throughput rate and low conversion per pass so as to achieve the substantially anhydrous conditions for subsequent passes. For these reasons, we prefer to conduct the reaction of the phenol and the ketone to about a 50% conversion of the ketone per pass. This permits continuous use of the resin catalyst while maintaining substantially anhydrous reaction conditions, that is, it limits the water content to less than 2–3 percent and generally will maintain it at 0.5 percent or less which is most desirable.

This catalyst is effective in promoting the reaction between phenols having a reactive hydrogen in the para position to the phenolic hydroxyl with a ketone. The phenols employed may have one or more substituents in the ortho and/or meta positions to the phenolic hydroxyl, for instance alkyl, halogen and similar non-reactive groups as for example, ortho and meta cresol, 2,6-dimethyl phenol, meta-xylenol, tetramethylphenol, 2,6-ditertiary butyl phenol and other alkylated phenols as well as halogenated phenols such as ortho and meta chlorophenol, 2,6-dichlorophenol, and the like. The substituents on the phenolic ring must be such as do not substantially hinder or impair reactivity of the hydrogen in the para position to the phenolic hydroxyl. We particularly prefer phenol itself ($C_6H_5OH$) as the phenolic reactant.

As the ketone, we prefer to use acetone, although other ketones having a methyl group connected to the carbonyl are also desirable and can be used in this process. For example, such other ketones having aliphatic or aromatic substituents, such as methyl ethyl ketones, methyl propyl ketone, acetophenone, methyl vinyl ketone and the like can be employed. Cyclic ketones, e.g. cyclohexanone can also be used.

It is obvious that the phenol and the ketone employed in this process determine the bisphenol which is produced.

The reaction readily proceeds with a slightly greater than stoichiometric amount of phenol to ketone in the reaction zone in contact with the esterified resin catalyst. Generally, at least 3 moles of phenol per mole of ketone is desirable although as much as 20 moles or more of phenol per mole ketone can be employed. However, above at such ratios, no additional benefit in reaction rate or operation is secured and the process becomes somewhat uneconomical. It is preferred, in order to secure the highest conversions and greatest reaction efficiency to employ mole ratios of phenol to ketone between about 6:1 and 12:1; more preferably at about a ratio of 10:1.

The duration of reaction time is dependent to a great extent upon the molar ratio of phenol to ketone, the exchange capacity of the resin, the degree of esterification, the temperature of reaction, the desired conversion per pass and water content in the reaction mixture. With the hereinbefore expressed preferred limits, a residence time of 20 to 60 minutes will generally provide about a 50% conversion of the ketone.

Our catalyst is suited to either continuous or batch operation. Continuous production can be carried out in a fixed resin bed most satisfactorily at temperatures in the range of 70° to 98° C. Higher conversions of phenol and ketone to bisphenol are not easily obtained at temperatures below 65° C. due to the crystallization of phenol and bisphenol in the system which causes a plugging of the column. Lower temperatures, down to about 40° C.

are satisfactory for batch production methods, however.

Pressure does not appear to be critical in the process of our invention and while atmospheric pressure is most convenient, either superatmospheric or subatmospheric pressures can be employed, if desired. The resistance to flow offered by a tightly packed bed of ion exchange resin used in continuous column operations necessitates a somewhat greater pressure at the inlet of the column than is present within the column itself, although gravity flow can be employed.

The recovery of the bisphenol product with the process of the present invention is simple and can be achieved in several ways, for example, by filtering the reaction mixture to remove the solid catalyst at a temperature above about 65° C. To recover the bisphenol or phenol-bisphenol complex crystals, the catalyst-free filtrate can be cooled to about 40° C. to 65° C., the crystalline bisphenol is filtered off and preferably distilled to yield a dry, recyclable phenol distillate and a bisphenol residue having a purity of 95% or better. Some bisphenol, phenol and most of the resinous reaction by-products remain in the filtrate and are recoverable by recycling, distillation, crystallization or other suitable means. The bisphenolic product produced in this process is, without separate purification steps, of a very high purity generally about 95–98%, and is uncontaminated with odors or traces of catalysts or byproducts. Yields are likewise proportionately high, being substantially higher than those secured with unesterified resin.

The following examples are illustrative.

EXAMPLES I–II

A cationic exchanging resin (a sulfonated cross-linked polystyrene resin sold under the name of "Dowex" 50–X–4 was dried at 75° to 85° C. until the water content was about 3 to 5 percent. The remaining water was removed by azeotropic distillation with N-heptane (B.P. 98° C.). The heptane remaining in the moisture-free resin was evaporated off by heating the resin in shallow pans at 75 to 85° C.

To determine the capacity of the resin, about 20 gms. of the dried resin was weighed accurately in a 50 ml. beaker and washed with distilled water into a column 30 inches long, by a 25 mm. diameter and equipped with a stopcock. The moistened resin was allowed to swell to 200 to 300% of its original volume before being poured into the column.

400 gms. of a 5% NaCl solution was passed through the resin bed by gravity feed at a rate of 0.4 ml. per minute and the effluent was collected in a 1-liter volumetric flask. In the beginning, the effluent was acidic due to the Na$^+$ ions replacing the H$^+$ ions in the sulfonic acid groups bound to the polystyrene resin skeleton. Replacement or exchange of all of the H$^+$ ions was indicated by the effluent becoming neutral to litmus. At this point the exchange was complete. The now-exchanged resin was washed with distilled water and the effluent made up to 1 liter with distilled water. A 25 ml. aliquot of the effluent was titrated with standard 0.1 N NaOH solution to a phenolphthalein end point. The weight of the dried cationic exchanging resin was determined to be 19.5800 gms. The capacity was then determined from the following calculations:

25 ml. aliquot = 24.40 ml. of 0.1017 N NaOH $$\frac{(ml.\ liter)\ (N\ of\ NaOH)\ (40)}{weight\ of\ sample} = milliequivalents/gram\ of\ dry\ resin$$

$$(24.4)\ (0.1017)\ (40) = 5.1\ milliequivalents/gram\ of\ dry\ resin.$$

$$\frac{(weight\ of\ sample)\ (1000)}{(ml.\ liter)\ (N\ of\ NaOH)\ (40)} = gram\ of\ dry\ resin/one\ equivalent$$

$$\frac{(19.588)\ (1000)}{(24.4)\ (0.1017)\ (40)} = 197.4\ grams\ of\ resin/one\ equivalent.$$

The above was repeated using Amberlite XE–100.

Tabulated below is data for the total capacity of Amberlite XE–100 and Dowex 50–X–4.

| | Milliequivalents/g. of dry resin | Grams of dry resin/one equivalent |
|---|---|---|
| Amberlite XE–100 | 4.63 | 216.0 |
| Dowex 50–X–4 | 5.11 | 197.4 |

From the above measurement we have obtained the capacity of the resin or number of sulfonic acid groups in the cation exchange resin.

The resin, the capacity of which has just been determined, was mixed with 1¼ times its own weight of N-heptane and the mixture was heated to boiling with agitation under reflux until no visible water separated in the reflux trap. Anhydrous conditions having thus been ensured, the resin was ready for the esterification step.

An amount of mercapto alcohol sufficient to esterify from 5 to 15 percent of the sulfonic acid groups of the resin was added dropwise, and the water of reaction was collected in the reflux trap. When the reaction was complete, as indicated by the stoichiometric amount of water being collected, the esterified resin was filtered off and washed several times with n-heptane and dried at 75–85° C. Its capacity was determined as before described, and the percent esterification determined according to the following formula:

$$\frac{(Total\ capacity\ before\ esterification - total\ capacity\ after\ esterification) \times 100}{Total\ capacity\ before\ esterification}$$

= percent esterification

The reaction efficiency of various catalysts esterified to varying percentages was tested in the preparation of 2,2-bis-(4-hydroxyphenyl)propane as follows:

The catalysts to be evaluated was first treated with dry phenol by mixing one part of catalyst with 3 parts of dry phenol and heating the mixture to 80–90° C. for thirty minutes, and then filtering off the catalyst under about 20″ (Hg) vacuum. The resulting solid product contained about 60–65% resin catalyst and 35–40% phenol as a swelling agent and a surface coating.

The catalyst was added to a mixture of phenol and acetone in a molar ratio of 10 to 1, using about one hydrogen equivalent of catalyst to one mole of acetone. The reaction mixture was heated with agitation, under reflux to temperatures of 75° C. and 95° C., and held at these temperatures for periods of time varying from one to five hourse as indicated below. At the end of the periods, the catalyst was filtered from the reaction mixture, and washed with about a mole of phenol. The filtrate plus washings was then distilled to 200° C. under vacuum of 0.5 mm. Hg. The bisphenol was obtained as a residue which crystallized out on cooling. The following table gives the percent yield of bisphenol for various reaction times and temperatures for catalysts esterified 3%, 9% and 20%.

*Table*

| No. | Catalyst | Percent Promoted | Reaction Conditions, Phenol/Acetone Mol Ratio | T., °C. | Time, hrs. | Percent Yield Residue Bisphenol A |
|---|---|---|---|---|---|---|
| 1 | Dowex 50–X–4 | 0 | 10:1 | 75 | 5 | 70–75 |
| 2 | do | 3 | 10:1 | 75 | 5 | 85–90 |
| 3 | do | 0 | 10:1 | 75 | 2.5 | 50–55 |
| 4 | do | 3 | 10:1 | 75 | 2.5 | 85–90 |
| 5 | do | 0 | 10:1 | 95 | 0.5 | 50 |
| 6 | do | 9 | 10:1 | 95 | 0.5 | 80–85 |
| 7 | do | 20 | 10:1 | 95 | 0.5 | 85–90 |
| 8 | do | 0 | 10:1 | 95 | 1 | 70–75 |
| 9 | do | 3 | 10:1 | 95 | 1 | 85–90 |
| 10 | do | 9 | 10:1 | 95 | 1 | 90–95 |
| 11 | do | 20 | 10:1 | 95 | 1 | 95–98+ |

Comparison of Nos. 1 and 2 indicates that, with other factors held constant, as little as 3% esterification provides significant increases in percentage yield or in other words, a significant increase in reaction rate. The data in Nos. 1 and 3 point out the effect of a reduction in time on the yields obtained with an unpromoted catalyst; while a comparison of No. 1 with No. 4 indicates that a 3% esterified resin provides yields equivalent to those obtained in twice the time with an unpromoted resin. Nos. 5, 6 and 7 demonstrate that superior yields are obtained with the promoted catalyst even with sharply reduced reaction time which, ordinarily would be expected to reduce the yields (cf. No. 5).

The progressive increase in yield obtainable with an increased degree of promotion is evident from a consideration of Nos. 8, 9, 10 and 11. With other factors such as temperature, molar ratio, and time held constant increased degrees of promotion gave increased yields. No. 11, which is a preferred embodiment, gave yields comparable to any known process. About 20% esterification is a maximum because above that amount the decrease in the number of cation exchanging groups deleteriously affects the catalytic effectiveness of the resin.

It is important to note that the yields of residue bisphenol obtained in the examples above were free from all traces of catalyst and promoter, and suitable for highly critical uses without further purification.

What is claimed is:

1. A process for the production of bisphenols which includes the steps of contacting a mixture of a phenol having a reactive hydrogen in the para position to the phenolic hydroxyl and a ketone having at least one methyl group connected to the carbonyl at a temperature of at least 40° C., said mixture containing a stoichiometric excess of said phenol with a substantially anhydrous cationic exchanging polymeric resin which is partially esterified with a lower alkyl mercapto alcohol as the sole catalyst for the reaction of the phenol and the ketone, said resin being substantially insoluble in the reaction mixture.

2. A process for the production of bisphenols which includes the steps of contacting a mixture of a phenol having a reactive hydrogen para to the phenolic hydroxyl and a ketone having at least one methyl group connected to the carbonyl, said mixture containing a stoichiometric excess of said phenol over said ketone with a substantially anhydrous cationic exchanging resin partially esterified with a mercapto alcohol containing from 1 to 6 carbon atoms as the sole catalyst for the reaction of the phenol and the ketone, said reaction being maintained under substantially anhydrous conditions and at a temperature between about 40° C. and 100° C. for a time sufficient to form a bisphenol by the reaction of the said phenol with said ketone and thereafter recovering the bisphenol from the resulting mixture.

3. The process of claim 2, wherein the phenol is present in an amount between 6 and 12 moles per mole of said ketone and wherein the said ketone is acetone.

4. A process for the production of bisphenols which includes the steps of contacting a mixture of a phenol having a reactive hydrogen para to the phenolic hydroxyl and a ketone having at least one methyl group connected to the carbonyl, said mixture containing a stoichiometric excess of said phenol over said ketone with a substantially anhydrous cationic exchanging resin having an exchange capacity of at least 2 milliequivalents per gram said resin being partially esterified with a mercapto alcohol containing from 1 to 6 carbon atoms in an amount wherein from about 3 to 20% of the cationic exchanging groups of said resin are esterified with the mercapto alcohol, said resin being the sole catalyst for the reaction of the phenol and the ketone, said reaction being maintained under substantially anhydrous conditions and at a temperature between about 40° C. and 100° C. for a time sufficient to form a bisphenol by the reaction of the said phenol with said ketone and thereafter recovering the bisphenol from the resulting mixture.

5. A process for the production of bisphenols which includes the steps of contacting a mixture of phenol ($C_6H_5OH$) and a ketone having at least one methyl group connected to the carbonyl, wherein said mixture contains from 3 to 20 moles of said phenol per mole of said ketone with a substantially anhydrous cationic exchanging resin in which from about 3 to 20% of the cationic exchanging groups of said resin having been esterified with a mercapto alcohol containing from 1 to 6 carbon atoms as the sole catalyst for the reaction of phenol and the ketone, said reaction being maintained under substantially anhydrous conditions and at a temperature between about 40° C. and 100 C. for a time sufficient to form a bisphenol by the reaction of phenol with said ketone, and thereafter recovering the bisphenol from the resulting mixture.

6. The process of claim 5, wherein the said ketone is acetone and wherein the phenol is present in an amount between 6 and 12 moles per mole of acetone.

References Cited in the file of this patent

UNITED STATES PATENTS

| 2,311,282 | Roblin | Feb. 16, 1943 |
| 2,359,242 | Perkins et al. | Sept. 26, 1944 |
| 2,468,982 | Jansen | May 3, 1949 |
| 2,471,454 | Rummelsburg | May 31, 1949 |
| 2,597,437 | Bodamer | May 20, 1952 |
| 2,597,492 | Hwa | May 20, 1952 |
| 2,628,983 | Aller et al. | Feb. 17, 1953 |
| 2,802,884 | D'Alelio | Aug. 17, 1957 |
| 2,891,916 | Hwa | June 23, 1959 |

OTHER REFERENCES

Sussman: Ind. & Eng. Chem., vol. 38 (1946), 1228–30 (3 pages).

Kunin et al.: "Ion Exchange Resins," pp. 137–139 (3 pages); pub. by John Wiley & Sons, Inc., New York (1950).

"Amberlite Ion Exchange," p. 10 (1 page), pub. by Rohn & Haas Co., The Resinous Materials Division, Philadelphia, September 1953.